United States Patent [19]

Stocchiero

[11] Patent Number: 5,665,486
[45] Date of Patent: *Sep. 9, 1997

[54] CONTAINER FOR RAPID CHARGED STORAGE BATTERIES

[76] Inventor: Olimpio Stocchiero, via Kennedy, 5, 36050 Montorso Vicentino (VI), Italy

[*] Notice: The term of this patent shall not extend beyond the expiration date of Pat. No. 5,498,488.

[21] Appl. No.: 505,243
[22] PCT Filed: Mar. 8, 1994
[86] PCT No.: PCT/EP94/00696
§ 371 Date: Nov. 7, 1995
§ 102(e) Date: Nov. 7, 1995
[87] PCT Pub. No.: WO94/20994
PCT Pub. Date: Sep. 15, 1994

[30] Foreign Application Priority Data

Mar. 9, 1993 [IT] Italy ............... VI93A0033

[51] Int. Cl.⁶ ...................................... H01M 10/04
[52] U.S. Cl. .......................... 429/100; 429/74; 429/81; 429/51
[58] Field of Search ................... 429/51, 74, 81, 429/83, 82, 95, 100, 120, 72, 175, 176, 73, 84, 179

[56] References Cited

U.S. PATENT DOCUMENTS

| | | |
|---|---|---|
| 1,163,991 | 12/1915 | Ford .................................. 429/83 |
| 2,505,207 | 4/1950 | Riggs . | |
| 4,008,355 | 2/1977 | Perkams ............................. 429/77 |
| 4,276,357 | 6/1981 | Ferrarini . | |
| 5,472,803 | 12/1995 | Flanagan ............................ 429/72 |
| 5,498,488 | 3/1996 | Stocchiero ......................... 429/82 |

FOREIGN PATENT DOCUMENTS

| | | |
|---|---|---|
| 60-56364 | 1/1985 | Japan . |
| 1576273 | 2/1977 | United Kingdom . |

OTHER PUBLICATIONS

Abstract of Japanese Patent 57–25669, Storage Battery, Akifumi Tanaka, Oct. 2, 1982.

*Primary Examiner*—Prince Willis, Jr.
*Assistant Examiner*—Carol Chaney
*Attorney, Agent, or Firm*—Watson Cole Stevens Davis, P.L.L.C.

[57] ABSTRACT

The invention is a container for storage batteries including a box (3, 20) provided with one or more cells, each of which is suitable to receive metallic plates (10) dipped in the electrolyte and connected to each other so as to make up a positive pole and a negative pole, a cover (2, 30) closed on the box along the perimetrical edge of said box, characterized in that each cell (3, 11, 12, 13) of said container has at least an electrolyte feed pipe (7, 14, 16, 18) with one end communicating with the opening made on the cover and with the other placed near the bottom of the box, and at least a level pipe (5, 15, 17, 19) of said electrolyte with one end communicating with the opening made on the cover and with the other end coinciding with the electrolyte level inside every cell.

3 Claims, 3 Drawing Sheets

CONTAINER FOR RAPID CHARGED STORAGE BATTERIES

The invention concerns a container for storage batteries specially suitable for short charge time batteries. The application for a Swedish Patent No. 7701184-9 on behalf of the YUASA BATTERY Co Ltd. shows a special device for producing electrolyte storage batteries as far as the rapid charge of said batteries is concerned. This device is characterized in that it includes a plug liable to be connected to the mouth of a cover in order to charge the electrolyte, where the plug comprises an input pipe and an output pipe through which the electrolyte, which prepares the charge for each cell of the battery, respectively flows in and out. The input pipe is longer than the output pipe and the output pipe is so high as to work as liquid level in the cell. The input and output pipes are generally coaxial, one inside the other. This special plug is safely screwed on or fastened to the mouth of each cell where the electrolyte is introduced, and the circulation of the electrolyte occurs in two times, one with low density electrolyte and the other with high density electrolyte.

During the circulation of the electrolyte, said electrolyte cools down outside the battery, so that the heat removal during the battery charging process shortens the time necessary for charging the battery. The circulation and the cooling of the electrolyte meaningfully reduce the time for charging the battery. According to a preceding and less complex technique, the charge of the battery takes place by introducing the electrolyte statically and without circulation. In this case the charge of the battery occurs in a few days instead of a few hours, as with the method just recalled.

The charging process with forced circulation of the electrolyte is, however, not free from drawbacks.

One of the main drawbacks of the charge device just recalled lies in the fact that the input and output pipes of the electrolyte, belonging to the plug, can get closed because of the dirt deposit connected to the circulation of the electrolyte. Therefore, the drawback is that, making use of the same devices over and over again, the circulation of the electrolyte slows down or stops. Besides, the frequent replacement of the plugs involves waste of time and expenses to bear.

The aim of the invention is to get over the drawbacks above highlighted.

The main goal of the invention is to carry out a container shaped in such a way as to fit for the quick circulation of the first-charge electrolyte, so that said circulation can take place as quickly and profitably as possible.

Moreover, the invention is meant to avoid clogs due to repeated utilization of the same devices for charges in different cells.

Another aim to achieve is that the container fitted for the circulation of the electrolyte accomplishes said circulation with the greatest effectiveness.

A final aim is that the container of the invention is cheap and, on the whole, profitable compared to the methods used up to now.

All the above-mentioned goals have been achieved by the container of the invention which comprises:

a box with one or more cells, each of which is suitable to receive metallic plates dipped in electrolyte and connected to each other so as to make up a positive pole and a negative pole;

a cover on the box closed along the perimetrical edge of said box, where said container is characterized in that each cell of said container has at least an electrolyte feed pipe, which is substantially vertical and has one end communicating with an opening made on the cover and the other placed near the bottom of the box, and at least a level pipe of said electrolyte, with one end communicating with an opening made on the cover and the other coinciding with the electrolyte level inside each cell.

To advantage, according to a favourite application of the invention, the electrolyte feed pipe and the level pipe are diametrically opposite to each other, so as to accomplish a turbulent circulation of said electrolyte inside the cell and in this way, therefore, the electrolyte effectively covers all the plates which have to soak in said electrolyte.

Furthermore, the possibility of making up more feed and outlet channels of the electrolyte allows to increase the flow rate of said electrolyte and consequently to reduce the charging time.

One of the advantages in reducing the charging time lies in the fact that batteries without charge, which are therefore completely inert, can be produced and stored, and consequently the battery cannot deteriorate because of long storage.

Besides, it can be expected that the battery production cycle undergoes a change lying in the fact that the first charge of the battery, since it is short, can also be directly assigned to the distributors of said batteries, who provide for the charge on customers request shortly before delivery.

Moreover if said at least one electrolyte feed pipe is obtained during the moulding phase of the box, it forms a single body with the same box. Therefore the electrolyte feed pipe doesn't reduce the inner space utilized by the standard plates inserted into the container.

Further distinctive features and peculiarities of the invention will be better highlighted in the description of a favourite application of the invention illustrated in the attached table as possible directions, without, however, setting limits:

Figure 5:
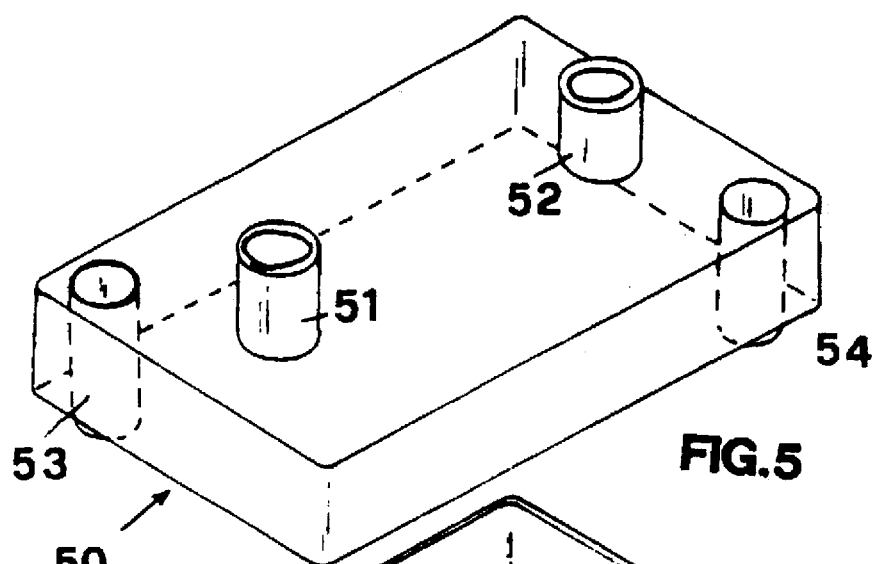
Figure 6:
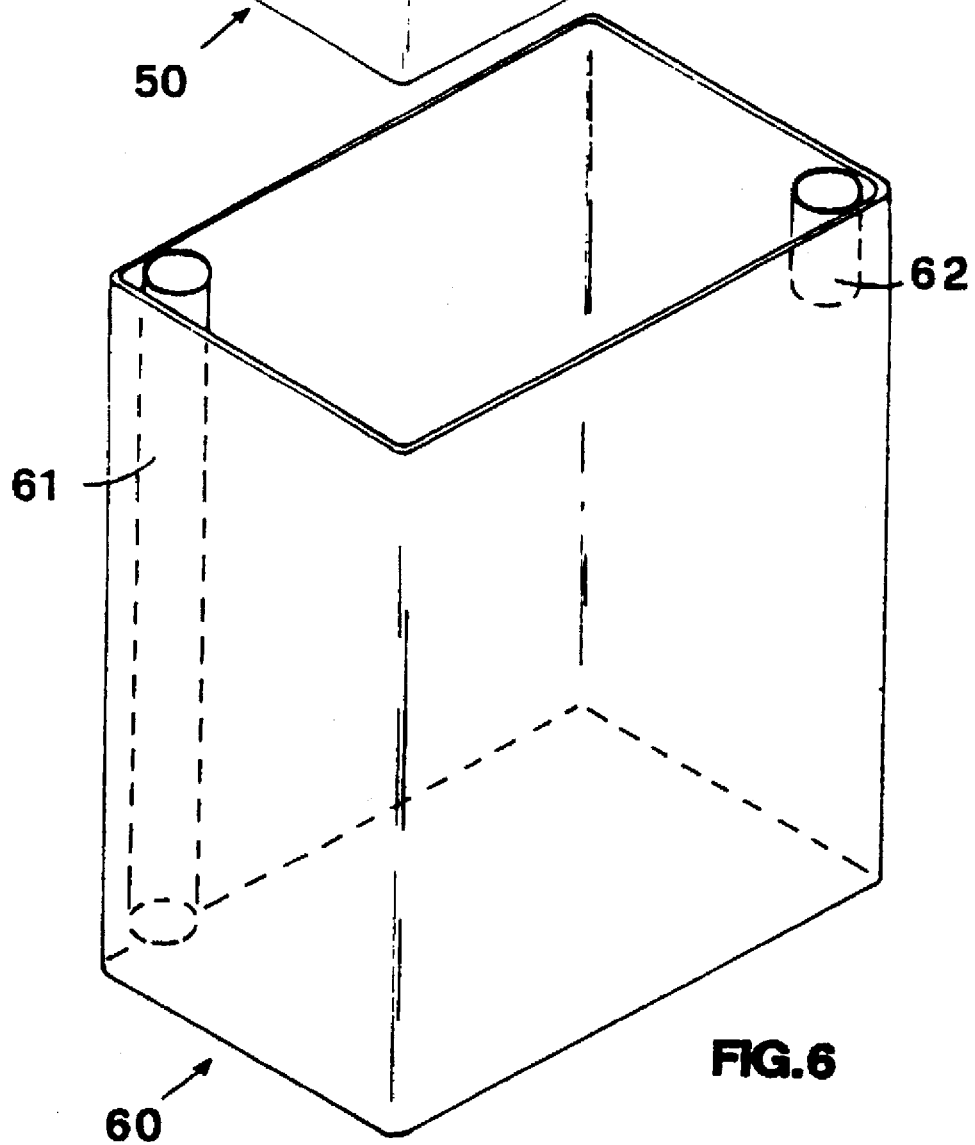

FIGS. 5 and 6 respectively show a variant of a cover and of a box that can be connected to each other according to the invention.

With reference to the above-mentioned figures, it can be noticed that the battery, referred to as a whole by 1, is a single-celled battery and has a cover 2 and a box 3. On the cover 2, as can be observed in FIG. 2, as well as holes 4 and 8 suitable to receive the positive and negative poles, there is also a pipe 5 that is the level pipe noticeable in FIG. 1 too. In the executive variant of the example, this pipe 5 is directly obtained upon molding of cover 2.

Diametrically opposite to pipe 5 there is another pipe 6, also made on the cover by molding, which, as it will be explained, will later be fitted into pipe 7 belonging to box 3. Said pipe 7 is the electrolyte feed pipe and, in the case of the example, is directly molded along with box 3 and extends for the whole height of the box to stop shortly before the bottom. When cover 2 is sealed on box 1, after fitting the battery elements 10 into it, the small pipe 6 is inserted inside the feed pipe 7, so as to make up a single feed channel. When the electrolyte is introduced in battery 1 for the first charge through pipes 6 and 7, which are now joined, it directly reaches the bottom of box 3 and covers the elements 10 until it fills the battery cell up to the level predetermined by the height of pipe 5; when the electrolyte reaches said level, it flows out of said pipe, leaving unchanged the inner level. As a consequence a circulation occurs between the feed pipe 6 and the outlet and level pipe 5.

The reciprocal position between the feed pipe 6 and 7 and the outlet pipe 5 avoids creating areas on the metallic elements which are not lapped by the electrolyte. Besides the possibility of carrying out feed and outlet pipes of a meaningful section or a multiplicity of said pipes, either feed or outlet pipes, also allows to ensure a rather important electrolyte rate flow, so as to create optimum conditions for reducing the charging time. As a matter of fact the circulation speed of the electrolyte quickens the battery charging process, as, on the other hand, the charging process is quickened by the fact that the electrolytic bath affects all the plates rather intensely.

Figure 3:
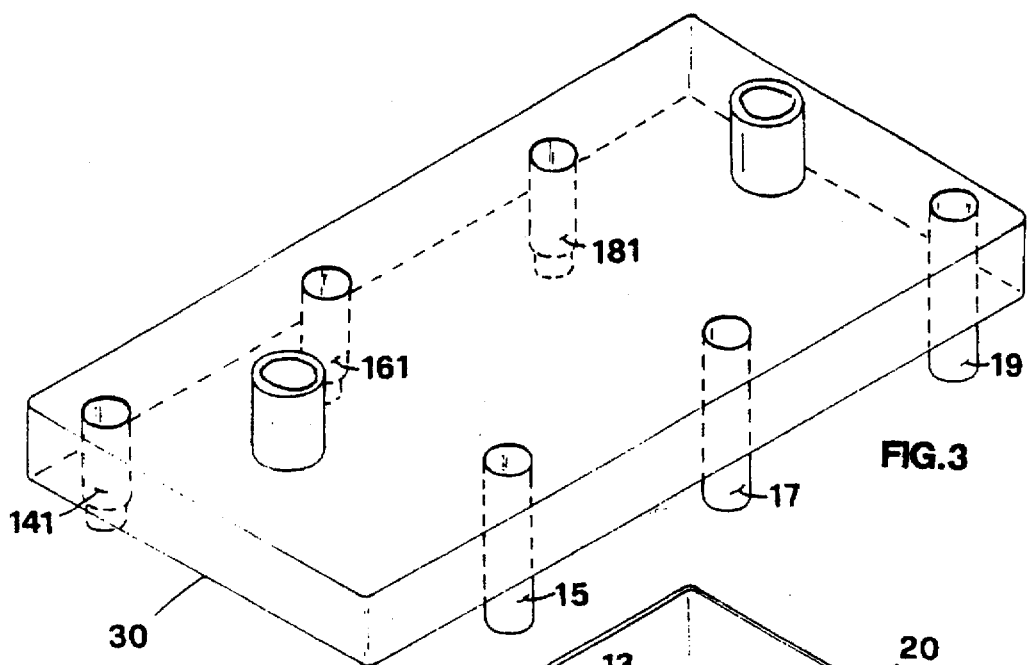
FIG. 3 shows a cover of the container of the invention for more-celled batteries.
Figure 4:
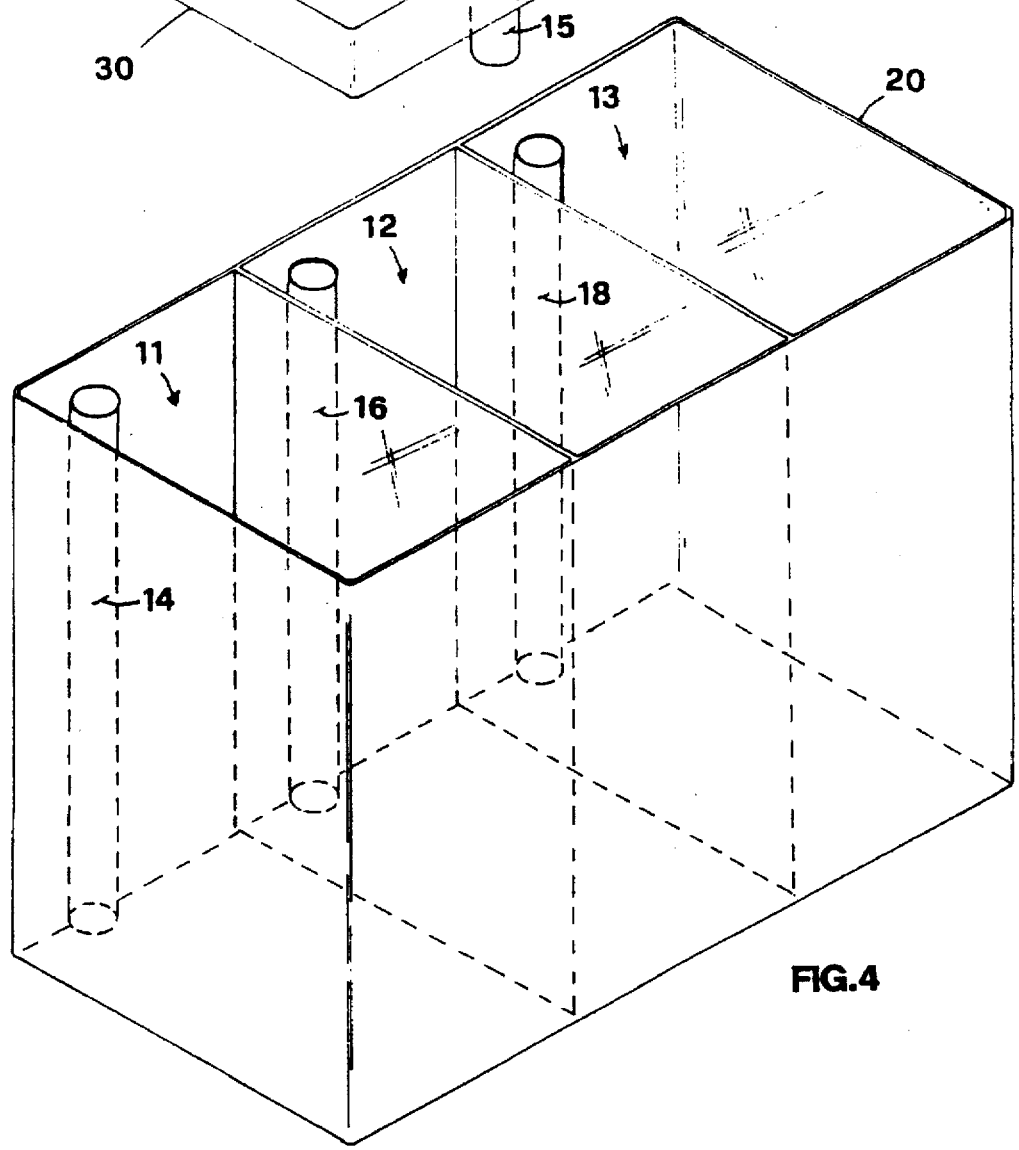
FIG. 4 shows a box compatible with the cover of FIG. 3.

In the case of FIGS. 3 and 4, we can observe respectively the cover and the box of a car starter battery which consists of more cells, here referred to by numbers 11, 12 and 13. It can be noticed that in this case each cell is respectively provided with an electrolyte feed pipe and a level pipe. More precisely cell 11 is provided with feed pipe 14 and level pipe 15; cell 12 is provided with feed pipe 16 and level pipe 17; cell 13 is provided with feed pipe 18 and level pipe 19. All the feed pipes 14, 16 and 18 belong to box 20, while the level pipes 15, 17 and 19 belong to cover 30, which is then sealed on box 20. In this case too, in correspondence with each feed pipe on the cover there will be a small pipe 141, 161 and 181 which will allow the junction of the lower feed pipe belonging to the box up to the outlet on the cover surface.

It is clear that in such a container as that represented by the invention it is possible to make the electrolyte flow with simple circulation means, such as pipes through which the electrolyte is moved by a certain head provided, for example, through a pump.

Another executive variant of the invention is shown in FIGS. 5 and 6, where it can be noticed that cover 50, besides the holes of poles 51 and 52, has two small pipes 53 and 54 molded along With the cover and said two small pipes have the same diameter and the same thickness as the feed pipe 61 and level pipe 62 obtained upon the molding of box 60.

In this way, when the cover 50 is sealed on box 60 along the perimetrical edge, also the small pipe 53 is sealed on the feed pipe 61 and likewise the small pipe 54 is sealed on the level pipe 62.

Figure 2:
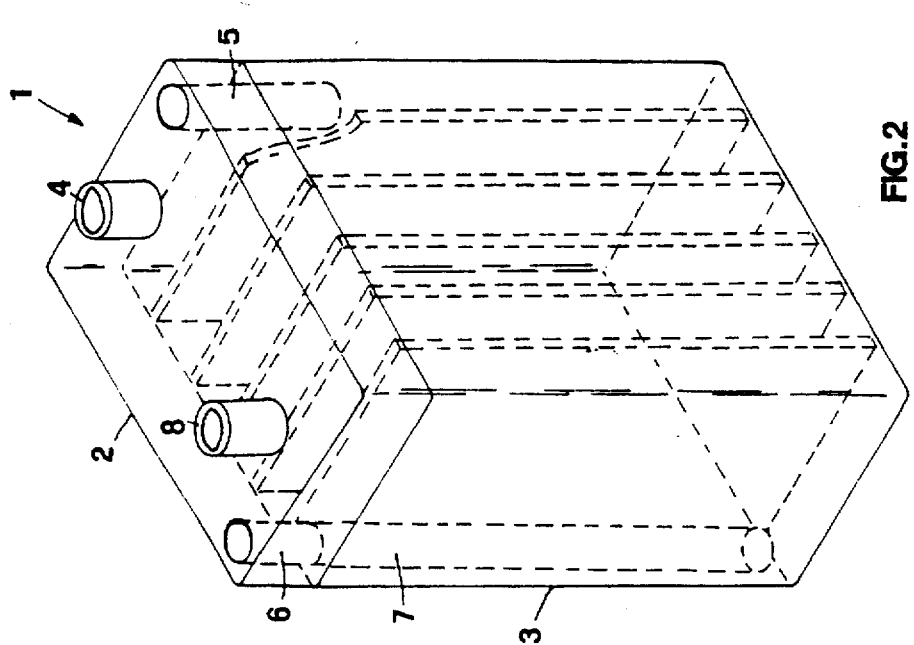
FIG. 2 shows the container of FIG. 1 with joined box and cover.
Figure 1:
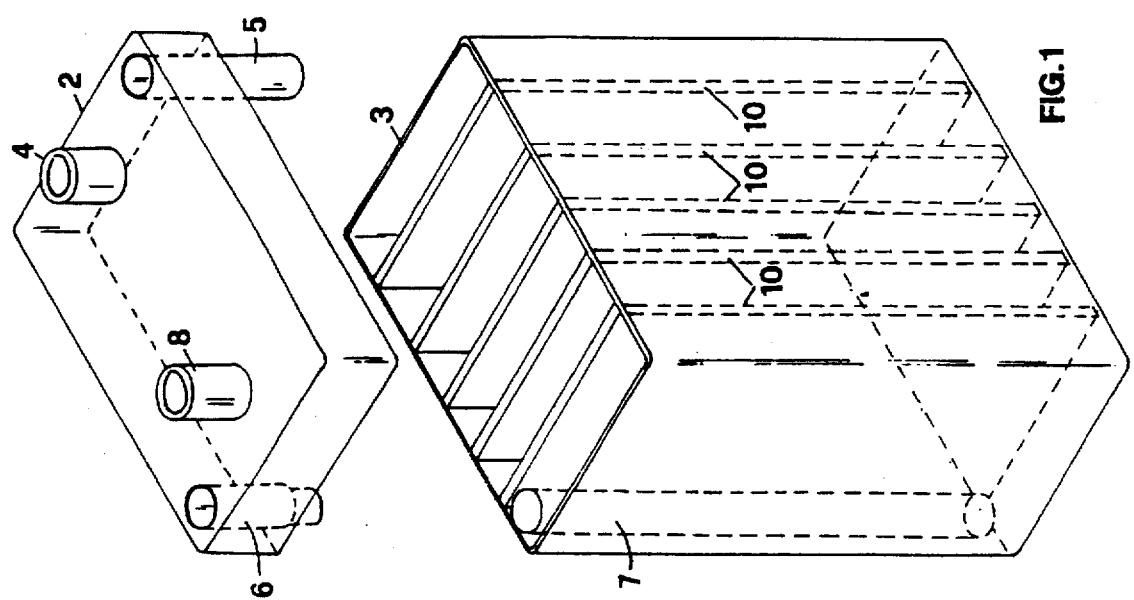
FIG. 1 shows a container of the invention for single-celled batteries with separate box and cover.

The examples of FIGS. 1, 2 and 3 show that the electrolyte feed pipe has been molded on the box.

This permits that the feed pipe inside the container doesn't reduce the inner space utilized by the standard plates inserted into the same container.

There is no difference if the electrolyte is molded separately and is then introduced into the box and fixed on a corresponding hole on the cover.

Another solution could be to directly mold the feed pipe along with the cover and then to introduce said pipe into the electrolyte.

Every variants and practical applications that have just been mentioned or that can be devised are considered as parts of the invention, as it is defined by the following claims.

I claim:

1. A container for facilitating rapid charge of electrolyte in a storage battery comprising:

a box having an open top formed with a perimetrical edge and with one or more cells, each cell of which is suitable to receive the electrolyte;

a cover secured to the top for closing the box along the perimetrical edge; the cover formed with a first and a second opening for each cell;

each cell of said container having at least one electrolyte feed pipe having an upper end communicating with the first opening in the cover, a lower end extending into the container adjacent to the bottom of the box, and a level pipe for establishing an electrolyte level in each cell having an upper end communicating with the second opening in the cover and a lower end extending into the container below the perimetrical edge of the top for establishing an electrolyte level in the container above the lower end of the feed pipe and said level pipe including a pipe portion formed in the cover molding.

2. A container according to claim 1 wherein the electrolyte feed pipe and the level pipe are placed on substantially opposite sides of each cell on a diagonal thereof.

3. A storage battery container adapted to be rapidly charged with an electrolyte and for receiving storage battery components therein for immersion in the electrolyte comprising:

a box having a bottom wall, side walls and an open top with a peripheral edge, said box being formed with at least one cell for receiving battery components and electrolyte therein;

a cover for engaging the open top of the box closing the same about the peripheral edge, said top having at least first and second openings therein;

said at least one cell including at least one electrolyte feed pipe having an upper end communicating with the first opening in the cover and having a lower end portion extending into the cell and adjacent the bottom of the box, and at least one level pipe for establishing a level for electrolyte in the cell, said level pipe having an upper end communicating with the second opening in the tope and lower end extending into the cell at a level above the lower end of the feed pipe for defining the electrolyte level at said lower end of said level pipe, said feed pipe being formed with a first section molded in the cover and a second interconnecting section molded in the box and said level pipe comprises a section molded into the cover, said level pipe and said feed pipe being spaced apart in said cover along a diagonal thereof for maximizing the distance therebetween.

* * * * *